Patented Nov. 24, 1942

2,302,777

UNITED STATES PATENT OFFICE 2,302,777

PROCESS OF MATTING TEXTILES

Albert Landolt, Riehen, and Gustave Widmer and Hans Benz, Basel, Switzerland, assignors to the firm of Society of Chemical Industry in Basle, Basel, Switzerland No Drawing. Application September 21, 1938, Serial No. 231,064. In Switzerland February 23, 1935

12 Claims. (Cl. 8—135)

The present application is a continuation in part of our copending applications Serial No. 64,796, filed February 19, 1936, now Patent No. 2,145,011, and Serial No. 153,444, filed July 13, 1937.

It has been found that very defined matt effects fast to washing can be obtained on textiles, such as artificial silk, natural silk, wool, cotton, mercerized cotton, linen, etc., with aid of water-insoluble condensation products from urea compounds and formaldehyde.

The new process is preferably applied in such a manner that a water-insoluble condensation product from formaldehyde and compounds of the urea group is dissolved in strong acids, such as hydrochloric acid, formic acid, or phosphoric acid, and that the liquid thus obtained is then diluted with water. The textile material is treated in the liquor thus prepared at a suitable temperature with or without an addition favoring the exhaustion of the liquor. During this treatment annulment of the lustre of the textiles takes place, the condensation product which is at first in colloidal form being precipitated on the fiber. The textile materials finished in known manner exhibit a strong matt effect which may be characterized by an excellent fastness to washing.

The condensation products may also be produced in the liquor itself by adding thereto the urea compound and the formaldehyde, or addition products thereof, such as mono- or dimethylol-urea, if desired together with suitable condensing agents. Or the liquor containing water-soluble condensation products is treated in such a manner that insoluble condensation products are produced in the liquor.

Also colored, pigment-like condensation products, which may be used in accordance with this invention, are well suited for matting, colored matt effects being obtained thereby. When suitable dyestuffs are selected, condensation, dyeing and matting may proceed simultaneously or successively.

It is already known to bring water-soluble condensation products from formaldehyde and urea compounds onto the fiber, and subsequently harden the same. Such processes, for example the process of Patent 1,926,063 cannot be compared with the processes of the present invention. Moreover, no matting effects are obtained with such processes, but anti-crease effects.

Compounds of the urea group suitable for the invention are for example urea itself, thiourea, biuret, guanylurea, guanidide, methylurea, phenylurea, and the like, also mixtures of these products with one another, particularly also those of urea and thiourea. Instead of formaldehyde, polymerides thereof, or agents yielding formaldehyde may be used.

The following examples illustrate the invention without however limiting the same; the parts being by weight unless otherwise stated:

Example 1

A urea-formaldehyde condensation product is made by dissolving 1 mol. urea in 2 mols. formaldehyde in aqueous solution, neutralizing the solution and heating it in a closed vessel for 6–8 hours at about 100° C. The feebly viscous water-soluble urea-formaldehyde condensation product thus obtained is dried at a low temperature in a good vacuum (product A).

To produce a matting bath 1 kilo of the product A is dissolved in 3 kilos of formic acid and the solution is poured into 300 litres of water at 80° C. The liquor is now cooled to 35° C. and 10 kilos of viscose artificial silk are entered and handled for 30 minutes. Rinsing and drying follow. The viscose has acquired a matt appearance fast to washing.

The formic acid may with a certain success be replaced by hydrochloric acid or lactic acid. The temperature at which matting is preferably effected is from 30 to 50° C. As a rule it is not advantageous to go higher.

Example 2

12.5 parts by weight of product A (compare Example 1) are mixed with 2.5 parts of thiourea and the mixture is dissolved in 15 parts of water. This solution is heated on an aluminium sheet for 4 hours at 130° C. and the foamy water-insoluble product is ground (product B).

12.5 kilos of a colloidal aqueous solution of 4 per cent. strength of product B are added to a bath of 300 litres of water at 35° C., 3 kilos of aluminium sulfate are then added and 10 kilos of artificial silk are entered. After 30 minutes handling, the silk has obtained a matt appearance, thoroughly fast to washing.

Example 3

2 gram-mol. dicyandiamide are dissolved by long heating on the boiling water-bath in 4 gram-mol. aqueous formaldehyde. The solution is then filtered through a little animal charcoal and the clear liquid is treated at 130° C. on an aluminium sheet for 4 hours; it first dries and then becomes hardened by the heat. The foamy mass, insoluble in water, is pulverized (product C).

To 600 litres of water at 35° C. are added 10 litres of a solution of 20 per cent. strength of product C in formic acid. 1.6 kilos of Glauber's salt are then added and 20 kilos of viscose knitted goods are treated in the liquor for 30 minutes on a rotating reel. After rinsing and drying the goods exhibit good matting effect, which is fast to washing.

Example 4

12.5 kilos of product A are dissolved together with 2.5 kilos of thiourea in 60 litres of water at 60° C. There are then added 4 litres of a solution of hydrochloric acid of about 4 per cent. strength, whereupon in the course of a few minutes a curdy precipitate separates. It is heated for 1 hour at 70° C. and allowed to cool overnight. The now brittle precipitate is washed free from chlorine and dried for 7 hours at 60° C. (product D).

2.5 litres of a solution of 40 per cent. strength of product D in formic acid are poured into 300 litres of water at 35° C. There are then entered 10 kilos of Bemberg artificial silk and after 10 minutes 2 kilos of Glauber's salt are added. After half-an-hour's adsorption the artificial silk is removed from the bath, rinsed and dried. In this manner there is obtained a strong matt effect fast to washing.

A somewhat stronger matt effect, which is also fast to washing, is obtained by after-heating the product D for 1 hour at 130° C. before it is dissolved in formic acid.

Example 5

A solution of 60 parts of urea and 150 parts by volume of formaldehyde solution of 40 per cent. strength by volume is diluted with 100 parts by volume of water. In this solution 0.9 part of ammonium chloride is dissolved. This liquid is allowed to stand overnight, filtered and the separated precipitate is dried and dissolved in formic acid. So much of the solution is added to the matting bath as is necessary to introduce 5–10 per cent. of the dry urea-formaldehyde condensation product, calculated on the fibre. The textile material is now entered into the lukewarm vat and handled therein until the desired effect is obtained. After rinsing and finishing a matt effect fast to washing is obtained.

Example 6

A solution is prepared from 60 parts of urea and 150 parts by volume of formaldehyde of 40 per cent. strength and diluted with 100 parts by volume of water. In this solution 0.9 part of ammonium chloride is further dissolved. The whole is allowed to stand overnight whereupon it is filtered and the precipitate which has separated is dried, the latter is then dissolved in formic acid. Of this solution there is added so much to a matting bath that it contains 5–10 per cent. of the dry urea-formaldehyde condensation product, calculated on the weight of the fiber to be matted. The viscose artificial silk is then handled in the lukewarm matting bath for ½ hour. After rinsing and finishing there is obtained a matt effect which is decidedly fast to washing.

Example 7

4 parts of dimethylol-urea, 1 part of calcined sodium sulfate and 1 part of thiourea are dissolved hot in 24 parts by volume of water and to this hot solution 0.12 part of sulfuric acid is added. After a minute, a white precipitate begins to separate, which is then filtered after cooling, washed free from acid and dried (product F).

¼ litre of a solution of 40 per cent. strength of product F in formic acid is added to 30 litres of water at 35° C. Into this liquor 1 kilo of dyed artificial silk stockings are introduced and handled for 30 minutes. After the usual finishing, the stockings present a matt appearance fast to washing.

Example 8

A solution of 40 per cent. strength of dimethylol-urea in formic acid is prepared. 250 cc. of this dimethylol-urea-formate solution are added to a matting bath consisting of 30 litres of lukewarm water and 40 grams of Glauber's salt. 1 kilo of Bemberg artificial silk yarn is now entered and handled for 30 minutes. If viscose artificial silk dyed with a direct dyestuff is treated in such a liquor there is obtained an excellent matt effect.

Example 9

60 parts of urea are dissolved in 75 parts by volume of aqueous formaldehyde of 40 per cent. strength by volume and the solution is mixed with 2.4 parts by volume of concentrated hydrochloric acid. The precipitate is filtered, washed and dried (product G).

This product is then dissolved in its own weight of heated hydrochloric acid to produce a clear solution.

To make the matting liquor 300 litres of cold water and 2 litres of the hydrochloric acid solution of product G referred to above are mixed. 10 kilos of viscose artificial silk are entered and handled for ¾ hour. Thorough washing and drying follow. There is obtained a matt effect fast to washing.

Example 10

To 12.5 kilos of an aqueous colloid emulsion of 4 per cent. strength of product F (Example 7) are added 300 litres of water at 35° C., followed by the addition of 3 kilos of aluminium sulfate. 10 kilos of artificial silk are entered into this bath and after 30 minutes handling there is obtained a good matt effect, fast to washing.

Example 11

400 grams of the product D obtained as described in Example 4 and after-heated at 130° C. for 1 hour, are dissolved in 1 litre of formic acid of 85 per cent. strength and the solution is poured into 80 litres of water at ordinary temperature. 4 kilos of mercerized cotton yarn are entered into this liquor. After the yarn has been handled for 10 minutes 80 grams of crystallized sodium sulfate are added to the bath, handling is continued for a further 10 minutes and the bath is heated to 35° C. After 15 minutes the cotton yarn is removed, rinsed in water and dried. The yarn shows no lustre and the matt effect remains after washing. In like manner, silk, wool and acetate artificial silk can be matted.

Example 12

The water-soluble product A (compare Example 1) is hardened for 4 hours at 130° C. and thereby made insoluble in water (product H).

1 part of this product H is dissolved in 4 parts by volume of hot formic acid of 85 per cent. strength and the solution is poured into 300 parts of water at 35–40° C. A white colloidal solution is produced. 10 parts of natural silk (for example in the form of hanks) are handled in this liquor for 30 minutes. A good matt effect is obtained which is fast to washing.

*Example 13*

1 part of product H is dissolved in 4 parts by volume of hot formic acid of 85 per cent. strength and the solution is poured into 300 parts of water at 35–40° C. A white colloidal solution is produced. 10 parts of acetyl cellulose artificial silk (for example in the form of hanks) are handled in this liquor, and, after some minutes, 3 per cent. of Glauber's salt, calculated on the artificial silk material, are added, whereby the matting substance is adsorbed by the artificial silk within half-an-hour. A good matt effect is obtained which is fast to washing.

Mercerized cotton can be matted in similar manner.

*Example 14*

10 parts of viscose artificial silk are matted in the following matting liquor:

1 part of product B (compare Example 2) is dissolved by heating in 4 parts by volume of acetic acid of 40 per cent. strength, whereupon 300 parts of water are added. There is formed a weakly opalescent matting liquor. The artificial silk is handled in this liquor for 45 minutes at 35–40° C.

There is obtained a strong matting fast to washing.

*Example 15*

10 kilos of artificial silk yarn are introduced into 100 liters of a liquor containing per liter 15 grams of urea and 37.5 cc. of formaldehyde of 40 per cent. strength. Shortly before introducing the material 16 cc. of hydrochloric acid of 31 per cent. strength are added to the bath. After a short time the liquor shows a milky turbidity. After at least ½ hour the yarn is rinsed and dried.

Similar results are obtained if the hydrochloric acid used in the first paragraph of this example is replaced by sulfuric acid, phosphoric acid, lactic acid or trichloracetic acid.

The viscose artificial silk has a strong matting fast to washing.

*Example 16*

10 kilos of mercerized cotton or natural silk are introduced into 100 liters of a liquor containing per liter 15 grams of urea and 37.5 cc. of formaldehyde of 40 per cent. strength. Shortly before introducing the material 16 cc. of hydrochloric acid of 31 per cent. strength are added to the bath. After a short time the liquor shows a milky turbidity. After ½ hour the yarn is rinsed and dried.

The mercerized cotton or natural silk has a strong matting fast to washing.

Also wool can be matted in this manner.

*Example 17*

Artificial silk, which may consist of viscose silk or a cellulose ester or ether, such as acetyl cellulose, is impregnated with a liquor consisting of 145 parts of water, 30 parts of urea, 45 parts of a formaldehyde solution of 35 per cent. strength and 0.9 part of ammonium chloride. The material is centrifuged and left covered for 20 hours, whereupon it is rinsed and dried.

The artificial silk has a strong matt effect.

*Example 18*

10 parts of artificial silk, consisting for example of regenerated cellulose, are handled for ½ hour in a liquor consisting of a solution of 5 parts of dimethylol urea and 2 parts of hydrochloric acid of 31 per cent. strength in 100 parts of water. The artificial silk is then rinsed and dried. After this treatment it has become matted.

What we claim is:

1. A process for delustering textile material which comprises impregnating the material with a solution containing a member of the group consisting of (1) formaldehyde and a member of the group consisting of urea and thiourea, (2) a condensation product of formaldehyde and a member of the group consisting of urea and thiourea, and (3) an addition product of formaldehyde and a member of the group consisting of urea and thiourea, and an acid to cause an insoluble synthetic condensation product of formaldehyde with a member of the group consisting of urea and thiourea to precipitate in particulate form from said solution on to the material, and maintaining the material in contact with said solution until delustering takes place.

2. A process for delustering textile material which comprises impregnating the material with a solution containing a member of the group consisting of (1) formaldehyde and urea, (2) a condensation product of formaldehyde and urea, and (3) an addition product of formaldehyde and urea, and an acid to cause an insoluble synthetic condensation product of formaldehyde with urea to precipitate in particulate form from said solution onto the material, said acid having a dissociation constant K which is not less than $1.8 \times 10^{-5}$, and maintaining the material in contact with said solution until delustering takes place.

3. A process for delustering textile material which comprises impregnating the material with a solution containing a member of the group consisting of (1) formaldehyde and urea, (2) a condensation product of formaldehyde and urea, and (3) an addition product of formaldehyde and urea, and an acid to cause an insoluble synthetic condensation product of formaldehyde with urea to precipitate in particulate form from said solution onto the material, said acid having a dissociation constant K which is not less than $2 \times 10^{-4}$, and maintaining the material in contact with said solution until delustering takes place.

4. A process for delustering textile material which comprises impregnating the material with a solution containing a member of the group consisting of (1) formaldehyde and urea, (2) a condensation product of formaldehyde and urea, and (3) an addition product of formaldehyde and urea, and hydrochloric acid to cause an insoluble synthetic condensation product of formaldehyde with urea to precipitate in particulate form from said solution onto the material, and maintaining the material in contact with said solution until delustering takes place.

5. A process of treating textile material comprising matting the textile material by precipitating thereon the water-insoluble non-resinous condensation product of formaldehyde and urea in finely divided form from an aqueous acid solution thereof.

6. A process of treating textile material comprising matting the textile material by precipitating thereon the water-insoluble non-resinous condensation product of formaldehyde and thiourea in finely divided form from an aqueous acid solution thereof.

7. A process for delustering artificial silk which comprises impregnating the artificial silk with a solution containing formaldehyde, urea, and hydrochloric acid to cause an insoluble synthetic condensation product in particulate form to precipitate on the artificial silk from said solution, and maintaining the artificial silk in contact with the said solution until delustering takes place.

8. A process for delustering artificial silk which comprises impregnating the artificial silk with a solution containing a condensation product of formaldehyde and urea, and hydrochloric acid, to cause an insoluble synthetic condensation product in particulate form to precipitate on the artificial silk from said solution, and maintaining the artificial silk in contact with the said solution until delustering takes place.

9. A process for delustering artificial silk which comprises impregnating the artificial silk with a solution containing an addition product of formaldehyde and urea, and hydrochloric acid, to cause an insoluble synthetic condensation product in particulate form to precipitate on the artificial silk from said solution, and maintaining the artificial silk in contact with the said solution until delustering takes place.

10. A delustered textile fabric containing substantially only on its surface a condensation product of formaldehyde and a member of the group consisting of urea and thiourea in finely divided form as the delustering agent.

11. A delustered textile fabric containing substantially only on its surface a non-resinous condensation product of formaldehyde and urea in finely divided form as the delustering agent.

12. A delustered textile fabric consisting of artificial silk containing substantially only on its surface an insoluble synthetic condensation product of formaldehyde and urea in the form of finely divided discrete particles as the delustering agent.

ALBERT LANDOLT.
GUSTAVE WIDMER.
HANS BENZ.